Figure 1:
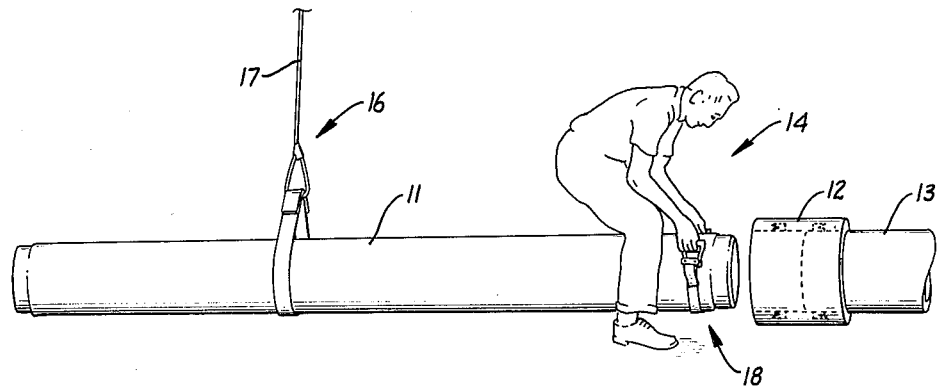

Oct. 12, 1965 J. B. GILL 3,211,489

PIPE STABBING AID

Filed Oct. 22, 1963

INVENTOR.
JOHN B. GILL
BY Schapp & Hatch
ATTORNEYS

United States Patent Office 3,211,489
Patented Oct. 12, 1965

3,211,489
PIPE STABBING AID
John B. Gill, 20433 Earl St., Torrance, Calif.
Filed Oct. 22, 1963, Ser. No. 317,963
5 Claims. (Cl. 294—31.2)

The present invention relates to a pipe stabbing aid, and more particularly to such a tool constructed to assist a worker in joining pipes in end-to-end relation for coupling thereof using a method known in the art as "stabbing."

Briefly speaking, the stabbing procedure involves thrusting the end of the pipe to be coupled into the bell or socket of an adjoining pipe or fitting. This axial thrust is preferably accomplished by supporting a pipe from a position above the center of gravity thereof and swinging the pipe in pendular motion in place. When small pipes are to be joined, the stabbing may be accomplished by hand with one or more workmen, and when larger pipes are to be coupled, it is customary to utilize a boom and suspend the pipe from the boom so that it may be swung axially to provide the desired stabbing action. In either case, the stabbing aid of the present invention is preferably utilized.

Workmen who use this stabbing technique, have developed a knack of swinging the pipe longitudinally from a boom and allowing the inertia of the mass and weight of the pipe to force it into the receiving end of the pipe or fitting to which a new length is being joined. This calls for accurate aiming and guiding of the pipe, because an improper aim can cause stabbing damage to the pipe ends. The present invention is directed to a simple device suitable for using as a stabbing aid in which the workmen have better control over the pipe so as to avoid the stabbing damage mentioned above.

The pipe stabbing aid of this invention not only helps prevent stabbing damage by reducing or eliminating misses as the pipes are thrust in telescoped position into one another, but it also saves time in providing a more complete coupling for the average operation. In other words, the stabbing aid allows a better controlled axial force to be applied so as to positively assure complete coupling as the pipes are brought together. This axial force is required because pipe is generally joined together with rubber ring gaskets or the like that are lubricated, and it takes an axial thrust to push the pipe through these gaskets into the bell or socket. In the event that the pipe is only stabbed partly into position, it is necessary to utilize other coupling aids in order to bring the pipes completely together. Accordingly, the more complete the coupling by the stabbing process, the more time is saved in providing the actually completed coupling.

Another important feature of the invention is the protection of the workman against injury when carrying out the stabbing procedure. For example, when stabbing 8, 10 and 12-inch pipes without the use of a boom, as is often done, one man lifts the pipe at the open end while the man at the coupling supports the pipe with his bare hands. The larger the pipe, the harder the pipe is to hold. Without an aid of any kind, the workman clasps his hands together underneath the pipe while straddling it thereby putting his back in a position of extreme flexure. This lifting movement is the cause of many a back injury. When using the stabbing aid as designed, the workman can lift with his knees and keep his back reasonably erect. This lifting operation is less tiring and less likely to cause back injury.

Accordingly, it is a primary object of this invention to provide a stabbing aid which enables the workmen to obtain a better grip on the pipe and to provide better control of the weight of the pipe in order to provide an improved stabbing operation.

Another object of the invention is to provide a pipe stabbing aid which enables the workmen to handle the pipe more easily so as to minimize possible injury to the workmen while handling heavy pipes.

A further object of the invention is to provide a pipe stabbing aid which increases the worker's speed in providing pipe couplings by reducing or eliminating the need for additional coupling operations to complete the positioning of the pipe after stabbing is accomplished.

Another object of the invention is to provide a pipe stabbing aid of the character described in which a tool is designed to safe-guard the worker against injury to his knuckles while simultaneously providing a temporary hand grip at a reasonably close proximity to the pipe.

Further objects and advantages of my invention will be apparent as the specification progresses, and the new and useful features of my pipe stabbing aid will be fully defined in the claims attached hereto.

Figures 2, 3:
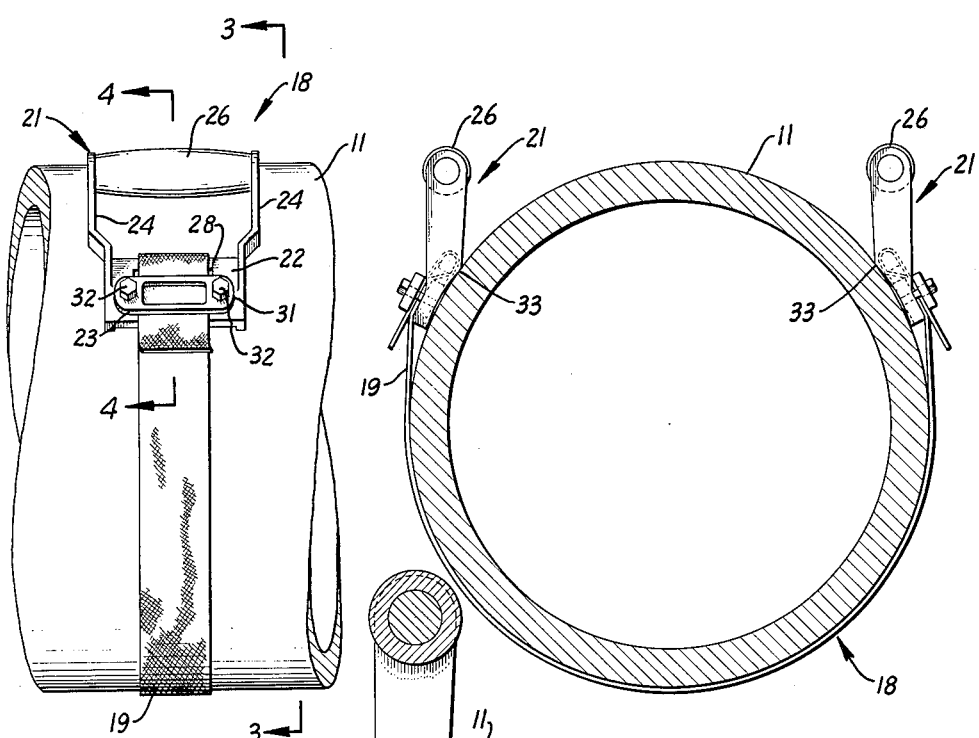
Figure 4:
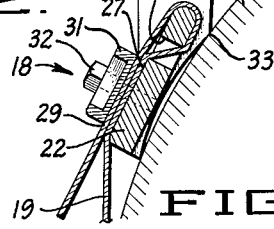

The preferred form of my invention is illustrated in the accompanying drawing, forming a part of this description, in which:

FIGURE 1 is an elevational view illustrating the pipe stabbing aid of this invention in actual use;

FIGURE 2, an enlarged elevational view of the pipe stabbing aid of FIGURE 1 as it appears in place on a pipe;

FIGURE 3, an end view of the pipe stabbing aid of FIGURE 2 taken in the plane of line 3—3 thereof; and FIGURE 4, an enlarged sectional view of a portion of the stabbing aid of FIGURE 2 taken substantially in the plane of line 4—4 thereof.

While I have shown only the preferred form of my invention, it should be understood that various changes or modifications may be made within the scope of the claims attached hereto without departing from the spirit of the invention.

Referring more particularly to the drawing, there is shown in FIGURE 1, a pipe 11 to be joined to the coupling 12 which is already installed on pipe 13. As here shown, a workman 14 is stabbing the pipe 11 into coupled position by swinging it in axial pendular motion. The pipe is held by a sling 16 which is supported by means of a cable or the like 17 which in turn is held by a boom (not shown) or other supporting structure so as to allow the pipe to be swung axially by the operator.

As here shown, the workman is utilizing a pipe stabbing aid 18 in order to carry out this maneuver.

Although the operation illustrated in FIGURE 1 shows one operator acting in concert with a second support, it will be appreciated that other stabbing operations may be carried out and that the operation illustrated is typical. In general, the pipes may be any pipes that can be coupled by a stabbing action such as asbestos-cement pipe, cast iron pipe, clay tile or steel pipe. In the drawing, a typical illustration of an asbestos-cement coupling is shown in which the couplings 12 carry chevron type gaskets which act as a seal. These gaskets, because of their chevron configuration wedge against the pipe making axial movement difficult. The gaskets are so positioned that they engage both the pipes and the couplings when the coupling is in place. Accordingly, to assemble the couplings on the pipes, the resistance of the chevron gasket has to be overcome, and a lubricant is used to assist in this movement. However, it will be appreciated that an axial stabbing thrust or force is necessary in order to provide the proper force for ramming the pipe 11 properly into the coupling 12.

From the foregoing description, it is seen that it is important for the operator to aim his pipe properly so that the pipe end does not bang the coupling during the stabbing action and cause damage. It is also important that the force from the swing be sufficient to drive the pipe into place in the coupling and yet not ram against the pipe 13 already in place so as to cause damage between pipe ends. Workmen soon become skilled in both aiming and adjusting the amount of swing in order to achieve the proper coupling operation when assisted with a stabbing aid 18 of the invention. In other words, the stabbing aid 18 provides sufficient control for the workman that this delicate maneuver may be carried out properly.

Referring more particularly to FIGURES 2 through 4, it is seen that the pipe stabbing aid 18 comprises a sling or strap 19 and a pair of handles 21 fastened at spaced locations on the sling to provide a handle at each side of the pipe when the sling is disposed against the lower surface of the pipe and extends around a major portion of the surface thereof, see FIGURE 3. Preferably, the handles are adjusted on sling or strap 19 so that the handles 21 will rest on the pipe surface as shown in FIGURE 3 with the gripping portions thereof about even with the top of the pipe surface and spaced sufficiently away from the pipe surface so that the worker does not hurt his knuckles on the pipe surface while installing the pipe.

In order to assure the proper spacing of the gripping portion of the handle, and to provide an especially tight grip on the pipe, the handles are preferably constructed to include a body portion 22 having a surface adapted to fit against the pipe, holding means 23 for adjustably holding the sling upon the handles at the proper adjusted location thereof, brackets 24 carried on said body portion and gripping means 26 on said brackets for providing a hand hold for the worker. As best seen in FIGURE 3, this hand hold is preferably adjusted by adjusting the length of the sling between handles so that the gripping means lie approximately at the height of the upper surface of the pipe.

As here shown, the body portion 22 and the bracket 24 are made from one piece with the brackets 24 extending at an obtuse angle with respect to the abutting surface of the body portion so as to bring the gripping means 26 away from the surface of the pipe and provide a leverage for tightening up the strap. The strap is adapted to be held on the surface of the body portion 22 opposite the abutting surface so as to assist in this leverage and obtain an extra tight grip. As best seen in FIGURE 4, the sling or strap passes over the body portion 22 at 27, passes through a slot 28 of body portion 22 and is wrapped therearound so as to fold back over itself at 29. A clamping plate 31 is then clamped tightly against the sling or strap at 27 and 29 by tightening bolts 32. With this construction, an exceptionally tight grip may be obtained on the nylon webbed sling or strap and this adjustment will be the same when the pipe stabbing aid is used for pipes of the same diameter. When pipes of different diameters are to be handled, the straps may be readjusted so as to accommodate these different sizes. The adjustment of the straps is achieved by laying the straps in place and tightening the clamping plate with the handles in proper desired position.

As indicated above, the angular disposition of the brackets with respect to the body portion is important in providing a tightening action of the strap by allowing the workman to bring the holding means 26 of the handles relatively closer together and thereby cause the handles to pivot at 33 and cinch up the sling or strap 19 tightly on the pipe surface. The weight of the pipe initially provides a bite on the sling and handles so that the strap is initially tightened. The lever action then adds to the tightening thereby obtained. This grip of the pipe stabbing aid gives the workman excellent control over the pipe.

From the foregoing description, it is seen that I have provided an improved pipe stabbing aid which provides excellent control for the workman in achieving a stabbing operation so that considerable time may be saved in making couplings and breakage reduced. In addition, it is seen that my pipe stabbing aid is a relatively simple device which is easily constructed and capable of many years of satisfactory service.

I claim:

1. A pipe stabbing aid comprising a strap adapted to fit around a major portion of a pipe, and a pair of handles fastened at spaced locations on the strap to provide a handle at each side of the pipe when the strap is disposed against the lower surface of the pipe; said handles each containing a body portion having a surface adapted to fit against the pipe, means on the body portion for holding the strap, brackets on said body portion having a pair of extensions lying in a common plane extending at an obtuse angle with respect to said body portion, and gripping means on said brackets carried between said extensions whereby a hand hold is provided for a worker at a distance away from the pipe surface.

2. A pipe stabbing aid comprising a strap adapted to fit around a major portion of a pipe, and a pair of handles fastened at spaced locations on the strap to provide a handle at each side of the pipe when the strap is disposed against the lower surface of the pipe; said handles each containing a body portion having a surface adapted to fit against the pipe, means on the body portion for tightly holding the strap on the side of the body portion opposite to the side abutting the pipe, brackets on said body portion having a pair of extensions lying in a common plane extending at an obtuse angle with respect to said body portion, and gripping means on said brackets carried between said extensions whereby a hand hold is provided for a worker at a distance away from the pipe surface.

3. A pipe stabbing aid comprising a strap constructed of nylon webbing and adapted to fit around a major portion of a pipe, and a pair of handles fastened at spaced locations on the strap to provide a handle at each side of the pipe when the strap is disposed against the lower surface of the pipe; said handles each containing a body portion having a surface adapted to fit against the pipe, means on the body portion for tightly holding the strap on the side of the body portion opposite to the side abutting the pipe, brackets on said body portion having a pair of extensions lying in a common plane extending at an obtuse angle with respect to said body portion, and gripping means on said brackets carried between said extensions whereby a hand hold is provided for a worker at a distance away from the pipe surface.

4. The pipe stabbing aid defined in claim 3, in which the body portions of the handles have concave surfaces adapted to fit against the pipe.

5. The pipe stabbing aid defined in claim 3, in which means are provided for fastening the handles at adjustable spaced locations on the sling.

References Cited by the Examiner

UNITED STATES PATENTS 1,199,330   9/16   Adams _____ 224—49 X
1,579,420   4/26   Welch _____ 224—49

SAMUEL F. COLEMAN, *Primary Examiner.*